Patented Oct. 16, 1934

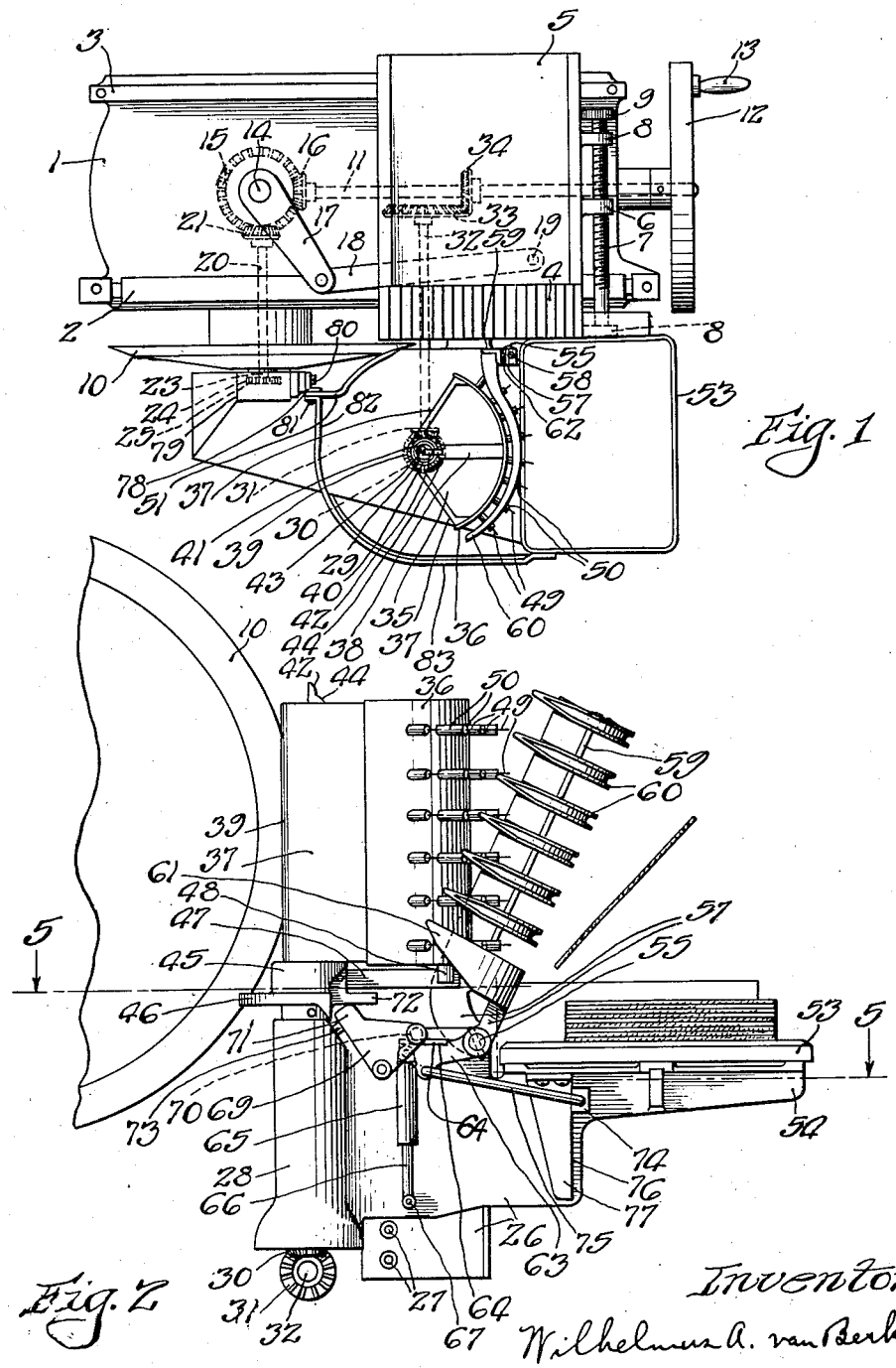

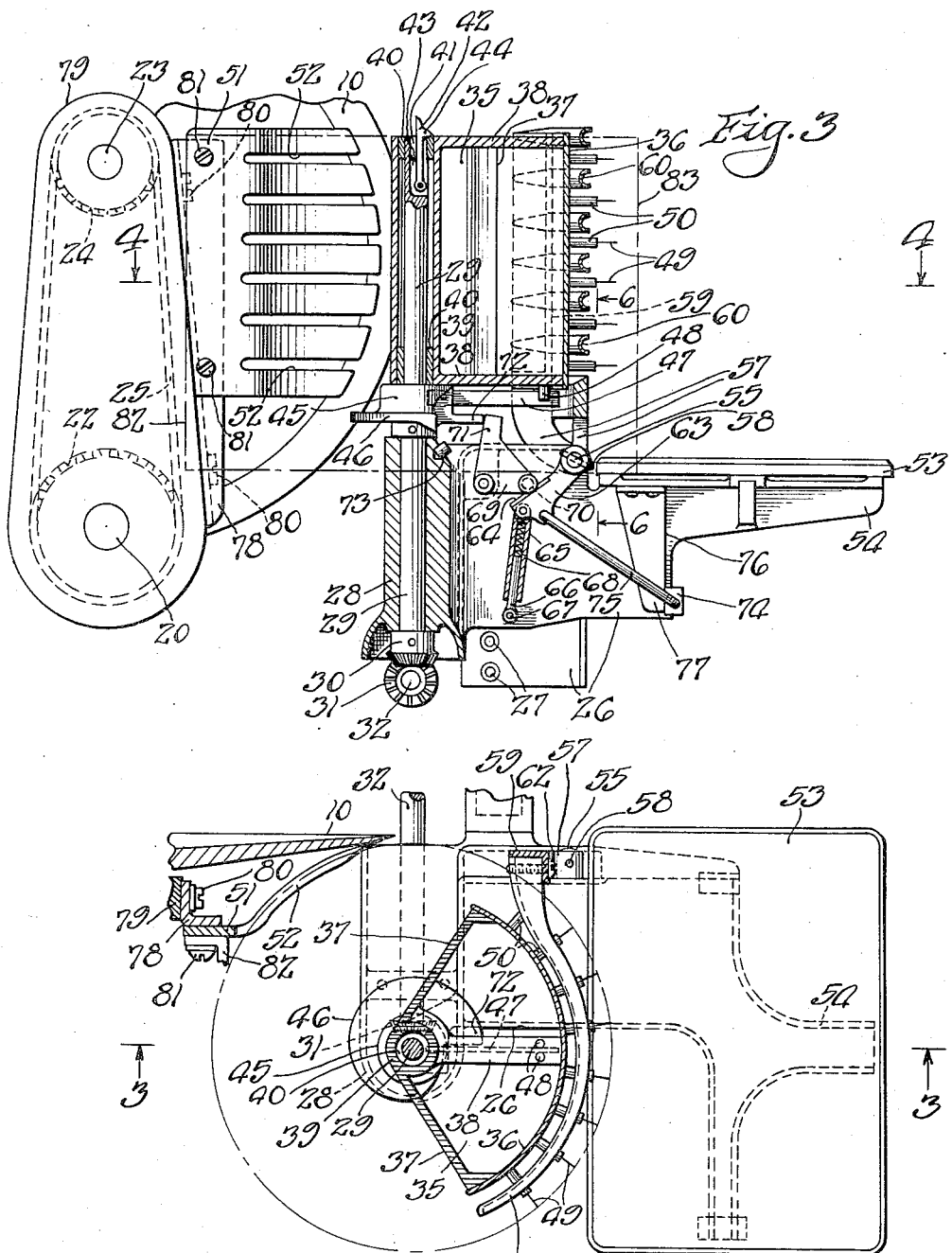

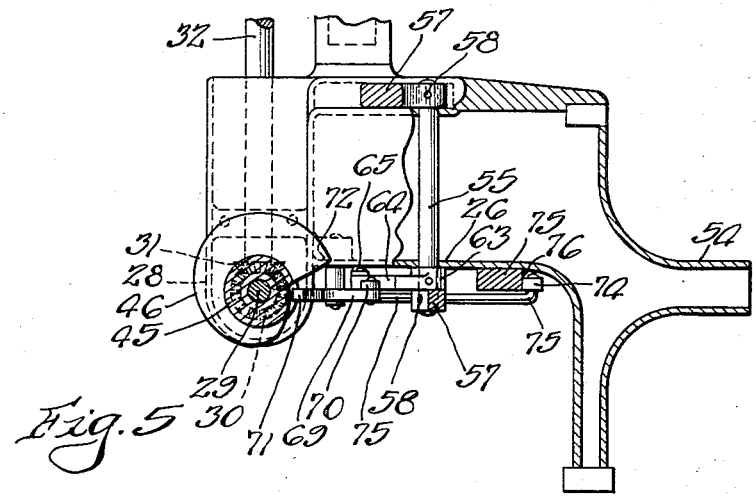
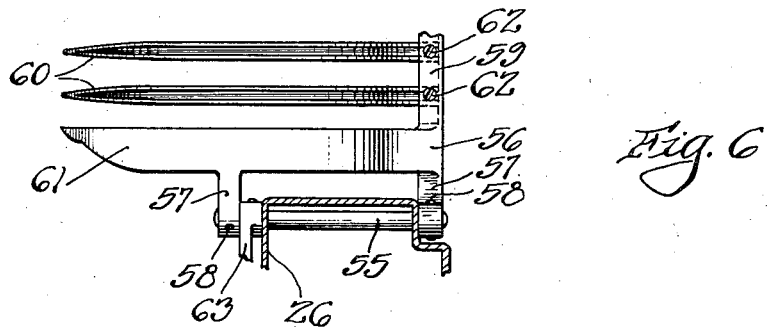

1,976,862

UNITED STATES PATENT OFFICE 1,976,862

SLICE STACKER FOR SLICING MACHINES

Wilhelmus Adrianus van Berkel, Clarens, Montreux, Switzerland, assignor to U. S. Slicing Machine Company, La Porte, Ind., a corporation of Indiana Application November 13, 1930, Serial No. 495,338
In Great Britain April 22, 1930

25 Claims. (Cl. 146—94)

The present invention relates to slicing machines and particularly to the stacking of the slices after they have been cut by the slicing knife.

One object of the present invention is to provide improved mechanism for stacking slices after they are cut, the slices preferably being stacked by being thrown toward the operator's position, whereas in prior devices it has been customary to stack the slices in the direction in which the substance is being fed toward the knife or in a direction at right angles to the feed of the reciprocating table.

More particularly my invention has for its object the provision of a rotary slice conveying means adapted to pick up the slice as it is formed and transfer it to a position wherein a plurality of fingers engage the slice and remove the same from the rotary slice conveying means and deposit the slice upon a support.

Another object of this invention resides in providing a slotted member adjacent the knife for pressing the slices onto suitable slice-engaging prongs mounted on the conveying means.

Another feature of this invention is the provision of shouldered prongs on the conveying means which prevent the slices from being pushed onto the prongs too far as it is important that a space be left between the surface of the conveying means and the slice to permit the fingers which remove the slice to be positioned between the slice and the surface of the conveying means.

The fingers which are supported on a pivot together with their support will hereinafter be referred to as the "discharge fly" in view of the fact that the same impels the slice with a quick movement which causes the slice to fly off the conveying means and onto the support, the slices forming a turning movement of approximately 90° before being deposited upon the support.

Another object of this invention is to provide the discharge fly with a brake means which retards the motion thereof toward the end of the movement of the fly to prevent jarring which might otherwise occur with the quick action of the fly.

Another object of this invention is to reduce the amount of space required for slice stacking slicing machines as in prior devices the slices have been stacked in a direction transversely to the carriage movement, thereby necessitating a slicing machine which is quite broad. In the present instance, however, the overall width of the slicing machine is not materially increased over the non-stacking slicing machines and the space required for the stacking operation does not extend beyond the overall length of the slicing machine. This result is obtained by having the slices brought into a position transversely to the carriage movement and having the discharge fly rotate about an axis at substantially right angles to the carriage movement.

In the drawings—

Fig. 1 represents a plan view of a slicing machine embodying my invention;

Fig. 2 is an elevational view of one side of the slicing machine shown in Fig. 1 with the carriage and base of the slicing machine removed so as to better illustrate the action of the stacking means, the base and carriage as well as the feeding means for the feed plate on the carriage being of conventional form;

Fig. 3 is a view similar to Fig. 2 showing the parts in a slightly different position than shown in Fig. 2, the section being taken along the line 3—3 of Fig. 4;

Fig. 4 is a section taken substantially along the line 4—4 of Fig. 3;

Fig. 5 is a section taken substantially along the line 5—5 of Fig. 2; and

Fig. 6 is a section taken along the line 6—6 of Fig. 3.

The slicing machine comprises the usual base member 1 with guides 2 and 3 upon which the carriage 4 is adapted to reciprocate. A feed plate 5 mounted on the carriage 4 is provided with a feed nut 6 engaging a feed screw 7 supported by the brackets 8 rigidly formed on the carriage 4. The feed screw also carries a ratchet wheel 9 which is adapted to be rotated a predetermined selected amount each time the carriage 4 reciprocates on the guides 2 and 3, thereby feeding the feed plate 5 toward the rotatably mounted slicing knife 10 in a well-known manner so that successive slices of uniform thickness will be cut from the substance being sliced.

A shaft 11 rotatably mounted in suitable bearings in the base is adapted to be rotated by a flywheel 12 having a handle 13 secured thereto. A vertically mounted rotatable shaft 14 is provided with a gear 15 meshing with a gear 16 on the shaft 11 and is also provided with a crank 17 above the base 1 of the machine but beneath the carriage 4. By rotating the shaft 11, the shaft 14 and consequently the crank 17 are rotated through the intermediary of the gears 15 and 16. The crank 17 is connected by a pitman 18 to the carriage at 19 so that the rotative movement of the crank 17 causes the carriage 4 to reciprocate along its guides.

A shaft 20 extending at substantially right angles to the shaft 11 has a gear 21 meshing with the gear 15, the other end of the shaft being provided with a sprocket 22. The knife 10 is secured to a shaft 23 and a sprocket 24 is also secured to the shaft 23 in vertical alinement with the sprocket 22. A chain 25 is trained over the sprockets 22 and 24 so that when the shaft 20 is rotated the slicing knife is rotated through the intermediary of the sprockets and chain.

Secured to one side of the slicing machine is a bracket 26. This bracket is secured in place by means of bolts passing through the openings 27 and through the side of the base, or may be secured thereto in any other suitable manner. This bracket carries a vertical bearing 28 in which the shaft 29 is rotatably mounted. This shaft has a gear 30 secured to the lower end thereof and this gear meshes with a gear 31 secured to the shaft 32 which runs parallel to the shaft 20 and has a gear 33 secured thereto meshing with a gear 34 secured to the shaft 11. The gearing is such that the shaft 29 is rotated once for every complete reciprocation of the table 4.

A slice conveyer 35 having the cylindrical surface 36 connected by means of the webs 37 and 38 to the sleeve 39, is adapted to convey the slices away from the slicing knife after the same have been formed. The sleeve 39 is provided with bushings 40 at the upper and lower ends thereof (see particularly Fig. 3). The upper end of the shaft 29 is provided with a recess 41 in which is arranged a pivoted catch 42 spring-pressed outwardly by means of the spring 43. A projection 44 is adapted to overlie the upper edge of the uppermost bushing 40 so as to retain the conveying member 35 on the shaft 29. However, the conveyer 35 is not secured to the shaft 29 but is free to rotate relatively thereto, except as it is limited by means hereinafter to be described.

Secured to the shaft 29 between the bearing 28 and the sleeve 39 is a member 45 having the cam surface 46 thereon, this cam being for a purpose which will appear presently. The member 45 also carries a spring tongue 47 which extends radially from the shaft 29 and which is adapted to lie between two pins 48 rigid with the web 38 of the conveyer.

As the shaft 29 is rotated the conveyer 35 is also rotated by the engagement of the spring tongue 47 with one of the pins 48, and if there is any resistance to the movement of the conveyer the spring tongue 47 may yield sufficiently to permit the conveyer 35 to be retarded in its movement. However, as soon as the resistance is discontinued the action of the spring is to accelerate the conveyer so that the total average time for a revolution of the conveyer is the same as the time of rotation for the shaft 29.

In slicing machines of this nature, especially where the carriage 4 is reciprocated by a crank and pitman connection, the movement of the carriage is not uniform; that is, the first part of the movement is an accelerated movement and the last part of the movement is a decelerated movement. Therefore if the conveyer 35 is rotated at a uniform speed, holes will be torn in the slice due to the difference in the speed of movement between the slice conveyer and the substance conveyer or carriage. With the arrangement described above, however, the conveyer 35 does not necessarily have to rotate at the same speed as the shaft 29 and therefore if the slice is moving slower than the conveyer, the spring tongue 47 will permit the conveyer to be retarded in its movement and holes will not be torn in the slice by the prongs which will be presently described. As soon as the slice is free of the substance, however, the conveyer movement is accelerated due to the action of the spring and arrives at the discharge position at substantially the same time as it would if rigidly attached to the shaft 29.

The cylindrical surface 36 of the slice conveyer is provided with a plurality of prongs each of which comprises a sharp needle-like portion 49 and a thickened portion 50 the latter portion being arranged adjacent the surface 36 and the former projecting outwardly as an extension of the latter. The thickened portion 50 acts as an abutment against which the slice is moved by the slice deflector and pressing member 51, illustrated best in Figs. 3 and 4. This slice deflector is arranged to engage the slice as it is severed by the knife and is provided with a plurality of slots 52, these slots being so arranged that the portions 49 of the prongs will pass therethrough. Therefore as the slice is cut the needle-like portions 49 engage the slice, and the portions of the member 51 which lie between adjacent slots will force the slice onto the needle-like portions 49 so that the slice is impaled thereon and is carried by the conveyer to the position illustrated in Figs. 3 and 4 where the slice is adapted to be discharged from the conveyer.

A support 53 mounted on a spider 54 formed as a part of the bracket 26 is adapted to receive the slices as they are discharged from the conveyer 35. A shaft 55 (see particularly Figs. 3, 5 and 6) is rotatably mounted in the bracket 26 and extends a substantial distance in a direction parallel to the adjacent edge of the support 53 and at substantially the same height as the support 53. This shaft has secured thereto the fly 56. This fly comprises bearing members 57 which have portions which encircle the shaft 55 and are pinned thereto by means of the pins 58, a vertical supporting member 59 and curved fingers 60 and 61, the fingers 60 being secured to the upstanding supporting member 59 by means of screws 62 or the like, and the finger 61 being formed integral with the bearing members 57 and the supporting member 59.

This fly is adapted to be moved back and forth between the positions shown in Figs. 2 and 3. Before the slices reach the discharge position the fingers 61 are arranged so that they will pass between adjacent rows of prongs and will be below the abutment surfaces formed between the thickened portions 50 and the needle-like portions 49 of the prongs when the slice arrives at the discharge position. When the slice arrives at the discharge position shown in Figs. 3 and 4, certain mechanism which I will now describe operates to throw the slice from the conveyer.

Rigidly secured to the shaft 55 is an arm 63 which has a hardened steel plate 64 on the outer upper surface thereof as best seen in Figs. 2 and 3. Pivoted to the outer end of the arm 63 is a casing 65, and a pin 66 pivoted at 67 to the bracket 26 slides within the casing 65. A spring 68 interposed between the inner end of the casing 65 and the end of the pin 66 is shown compressed in Fig. 3 so that its tendency is to rotate the arm 63 and consequently the fly in a clockwise direction. However, when the parts are in the positions shown in Fig. 3 the spring cannot rotate the arm 63. This is because of the fact that a pivoted member 69 having a roller 70 engaging the hardened steel surface 64 also has a projection 71 thereon adapted to engage the cam 46 and since in Fig. 3 the projection 71 is against the high part 72 of the cam, it is not possible for the member 69 to pivot in a counter-clockwise direction to permit the spring 68 to act. However, the high portion of the cam is followed immediately by an abrupt drop or break in the cam surface so that as soon as the cam has rotated a very small amount from the position shown in Figs. 3 and 4, the member 69 may rotate in a counter-clockwise direction to bring the projection 71 against a rubber stop 73 arranged within a recess in the bearing 28, the spring 68 causing the rotative movement of the member 69. When the member 69 rotates, the arm 63 will also rotate under the influence of the spring 68 and this will cause the fly to move to the position shown in Fig. 2. This movement of the fly moves the fingers 60 and 61 against the slice and throws the slice onto the support 53, or onto the previous slices which have been deposited thereon, thereby forming a loose stack of slices on the support.

The movement of the fly is rather abrupt and unless some means is provided for checking the movement thereof, there is apt to be considerable vibration or jar imparted to the machine. Therefore in order to prevent this annoying feature, I have provided a brake for retarding the movement of the arm 63 and consequently the fly. This brake comprises a brake-shoe 74 pivoted on a link 75 which in turn is pivoted to the arm 63. The brake-shoe 74 may be faced with leather, if desired, and the friction surface of the brake-shoe is adapted to slide along the surface 76 of the downwardly extending projection 77 secured to the underside of the spider 54. It will be seen that when the arm 63 rotates in a clockwise direction the link 75 will pull the brake-shoe against the surface 76 and the friction resulting from this pull will retard the movement of the arm 63 and thereby limit or check the rotative movement of the fly, and particularly the latter part of the movement. The brake-shoe offers substantially no resistance to the counter-clockwise movement of the fly which occurs as the shaft 29 continues to rotate and, as the cam 46 moves the projection 71 away from the shaft, the member 69 is rotated clockwise and the arm 63 is rotated counter-clockwise.

It will be noted from an inspection of Fig. 4 that the upstanding portion 59 of the fly is offset and is outside of the circle described by the points of the prongs so as not to interfere with the movement of the prongs during their rotation.

The presser member 51 is mounted on the bracket 78 secured to the casing 79 which surrounds the chain and sprockets, by means of the screw 80. The screws 81 which secure the member 51 to the bracket 78 also support one end 82 of a guard plate 83 which is high enough so that any one standing near the conveyer is not apt to be struck by the prongs during their rotation. This guard plate shown in Figs. 1, 3 and 4 is substantially of the same height as the member 51, or at least the uppermost ones of the prongs (see dotted lines in Fig. 3).

Other means may be used to rotate the fly. For instance, I may use a pendulous weight or a tension spring instead of a compression spring. Furthermore, I may use any other form of retarding means which I may find useful to prevent rapid movement of the arm 63 and of the fly.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a slicing machine, the combination with a rotating knife, of a substance support movable past said knife, a member having a cylindrical face, a rotating shaft upon which said member is mounted, a yielding connection between said shaft and member, a driving means for driving said substance support and shaft in timed relation with each other, said yielding connection causing said member to rotate but permitting said member to move relatively to said shaft as said shaft rotates, impaling prongs on said cylindrical member for retaining slices thereon, a discharge fly for removing slices from said prongs, and means controlled by the rotation of said shaft for actuating said discharge fly to move slices off said rotating member, said last-mentioned movement of said discharge fly being at a speed independent of the speed of rotation of said shaft.

2. In a slicing machine, the combination with a rotating knife, of a substance support movable past said knife, a member having a cylindrical face, a rotating shaft upon which said member is mounted, a yielding connection between said shaft and member, a driving means for driving said substance support and shaft in timed relation with each other, said yielding connection causing said member to rotate but permitting said member to move relatively to said shaft as said shaft rotates, impaling prongs on said cylindrical member for retaining slices thereon, a discharge fly for removing slices from said prongs, means controlled by the rotation of said shaft for actuating said discharge fly to move slices off said rotating member, said last-mentioned movement of said discharge fly being at a speed independent of the speed of rotation of said shaft, and a friction means for retarding the movement of said fly particularly at the end of said discharging movement.

3. In a slicing machine, the combination with a slicing knife for cutting slices from a substance, a substance carriage movable relative to said knife to present the substance to said knife so that slices may be severed therefrom, a support movably mounted adjacent said knife, a slice conveyer mounted on said support and having a yielding connection therewith so as to be driven by said support as said support is moved while permitting relative movement between said support and conveyer when a second force acts upon the conveyer to change its speed with relation to the speed at which the same is driven by said support, means for driving said support to carry said conveyer past said knife, means on said conveyer for receiving and retaining the slices formed by said knife thereon, the yielding connection between said support and conveyer permitting the conveyer to change its speed to accommodate itself to the speed of movement of the slice being severed by the knife and while the slice is being severed thereby, and a discharge means for discharging slices from said conveyer at a discharge position.

4. In a slicing machine, the combination with a knife and support movable relative to each other to sever slices from a substance on said support, a conveyer for receiving the slices as they are formed and for conveying them to a slice discharging position, yielding driving means for driving said conveyer so that the receiving surface thereof is moving at approximately the speed at which the slice is being severed from the substance, said yielding driving means for said conveyer permitting the slice to act on said conveyer to change the speed of movement of the conveyer while the slice is being received thereby, and means for discharging the slice from said conveyer when the latter reaches the discharge position.

5. In a slicing machine, the combination with a slicing knife and substance support movable relative to each other, of a slice conveyer for receiving slices as they are formed by said knife, impaling means on said conveyer upon which the slices are impaled as the conveyer moves past said knife, a driving means for said conveyer, a yielding connection between said driving means and said conveyer to permit movement of said conveyer relative to its driving means when forces act on said conveyer to change its rotational speed, and a discharge fly for discharging slices from said conveyer when the slices reach a predetermined position.

6. In a slicing machine, the combination with a slicing knife and support movable relative to each other to sever slices from a substance on said support, a conveyer having impaling prongs thereon and movable past said knife for receiving and impaling slices upon said prongs as the slices are severed by said knife, driving means actuated in timed relation to the relative movement of said knife and table for driving said conveyer, an operative connection between said driving means and conveyer comprising a flat spring connected to said conveyer and to said driving means respectively through which the driving means acts to drive said conveyer, and means for discharging slices from said prongs when said slices reach a discharge position.

7. In a slicing machine, the combination with a slicing knife and substance support movable relative to each other, a rotatable spindle arranged in spaced substantially parallel relation to the cutting plane of said knife, a member having an outer surface adapted to pass adjacent the cutting edge of said knife, impaling means on said surface, a yielding driving connection between said spindle and member for rotating said member to bring the outer surface thereof and impaling means adjacent the cutting edge of said knife, means for forcing the slice as it is formed onto said impaling means, and discharge means for discharging slices after they are formed onto a slice receiving surface.

8. In a slicing machine, the combination with a slicing knife and substance support movable relative to each other, a rotatable spindle arranged in spaced substantially parallel relation to the cutting plane of said knife, a member having an outer surface adapted to pass adjacent the cutting edge of said knife, impaling means on said surface, a yielding driving connection between said spindle and member for rotating said member to bring the outer surface thereof and impaling means adjacent the cutting edge of said knife, means for forcing the slice as it is formed onto said impaling means, and discharge means for discharging slices after they are formed onto a slice receiving surface, said discharge means comprising a fly mounted to rotate about a stationary support and having fingers thereon for engaging the side of the slice adjacent said surface on said member, and means for moving said discharge fly about its axis to remove a slice off said impaling means onto a support.

9. In a slicing machine, the combination with a slicing knife and substance support movable relative to each other, a rotatable spindle arranged in spaced substantially parallel relation to the cutting plane of said knife, a member having an outer surface adapted to pass adjacent the cutting edge of said knife, impaling means on said surface, a yielding driving connection between said spindle and member for rotating said member to bring the outer surface thereof and impaling means adjacent the cutting edge of said knife, means for forcing the slice as it is formed onto said impaling means, and discharge means for discharging slices after they are formed onto a slice receiving surface, said discharge means comprising a fly mounted to rotate about a stationary support and having fingers thereon for engaging the side of the slice adjacent said surface on said member, and means for moving said discharge fly about its axis to remove a slice off said impaling means onto a support, said means for moving said discharge fly about its axis being operable at a speed independent of the rotative movement of said spindle while controlled by the position of said spindle and having retarding means constructed to act with a greatly accentuated retarding movement at the end of the discharge movement of the slice to suddenly arrest the movement of the discharge fly to insure that the slice will be released from said fly and to deposit said slice loosely upon the slice receiving surface.

10. In a slicing machine, the combination with a slicing knife having its axis of rotation arranged in substantially a horizontal plane, of a conveyer for moving slices away from the knife after they are formed and while maintaining the slices in a substantially vertical position, and means for discharging slices from said conveyer comprising a pivoted arm having slice engaging means thereon for engaging the side of the slice adjacent the conveyer and for moving the slice outwardly away from the conveyer when the slices reach a discharge position, means for actuating said arm in a direction outwardly from said conveyer, and a braking means for retarding the latter part of the outward movement of the arm comprising a brake-shoe connected to said arm and slidable along the surface of a stationary member.

11. A discharge fly for removing slices from a conveyer which directly receives and conveys slices to a discharge position comprising a pivoted arm, fingers on said arm for engaging and moving the slice from said conveyer, and a brake shoe attached to said arm and moving along a braking surface on a stationary member, said stationary member being arranged with respect to the axis of rotation of said arm in such a manner that the braking effect on said braking surface increases at a rapid rate toward the end of the outward movement of the discharge fly away from the conveyer whereby the motion of the discharge fly is suddenly arrested without appreciable jar to thereby insure that the slice will not cling to the discharge fly, but will be entirely freed therefrom and thrown flatly onto the slice receiving surface.

12. In a slicing machine, the combination with a slicing knife, of a support movable past said knife for presenting a substance to the knife, a conveyer for receiving the slices as they are formed, impaling means on said conveyer for holding the slice on said conveyer, a discharge fly for discharging slices from said conveyer, a cam for normally holding said discharge fly in retracted position, and an operative connection between said discharge fly and cam, a spring for moving the discharge fly to a discharge position, a brake connected to said discharge fly, a stationary support along which said brake travels as said discharge fly is moved outwardly to discharge the slice from said conveyer, said cam having a portion thereof interrupted so as to suddenly release the operative connection between said cam and said discharge fly at a predetermined position of said conveyer whereby said spring may actuate said discharge fly and move the same to discharge the slice onto a slice receiving surface, said brake acting with a strongly accentuated retarding movement upon said discharge fly near the end of its discharge movement to suddenly arrest the movement of the discharge fly while cushioning the end of its movement, whereby said slice is released entirely from said discharge fly because of its own inertia and is carried onto a slice receiving surface.

13. In a slicing machine, the combination with a slicing knife, of stacking mechanism including a movable conveyer having means thereon for gripping the slices as they are formed, and driving means for said conveyer including yielding means to permit retardation of the conveyer to accord temporarily with that of the speed of movement of the slice as it is being severed when the speed is different from that normally imparted thereto by the driving means for the conveyer.

14. A slicing machine comprising a slice conveyer, means for driving said conveyer, and a yielding connection between said conveyer and driving means to permit said conveyer to travel at a different speed than that imparted thereto by said driving means when a supplemental force is applied to said conveyer other than that applied thereto by said driving means and without interrupting the drive to said conveyer by said driving means whereby the conveyer may have a normal driving speed and a speed which varies therefrom when said supplemental force is applied thereto.

15. In a slicing machine, the combination with a rotating knife, of a substance support movable past said knife, a slice supporting member, a rotating shaft on which said member is mounted, a yielding connection between said shaft and member, a driving means for driving said substance support and shaft in timed relation with each other, said yielding connection causing said member to rotate but permitting said member to move relatively to said shaft as said shaft rotates, means for holding a slice on said member as the same is formed by said knife and for conveying the same to a discharge position, a discharge fly for removing slices from said member when the slices reach a discharge position, and means controlled by said shaft as it rotates for actuating said discharge fly to move slices off said rotating member.

16. In a slicing machine, the combination with a rotating knife, of a substance support movable past said knife, a slice supporting member, a rotating shaft on which said member is mounted, a yielding connection between said shaft and member, a driving means for driving said substance support and shaft in timed relation with each other, said yielding connection causing said member to rotate but permitting said member to move relatively to said shaft as said shaft rotates, means for holding a slice on said member as the same is formed by said knife and for conveying the same to a discharge position, a discharge fly for removing slices from said member when the slices reach a discharge position, means controlled by said shaft as it rotates for actuating said discharge fly to move slices off said rotating member, and a friction means having a greatly accentuated action near the end of the discharge movement of said fly for retarding the movement of said fly whereby the movement of the discharge fly is suddenly arrested and the slice being moved thereby is carried forwardly onto a slice receiving surface without materially affecting its directional movement as determined by said fly.

17. A discharge fly for removing slices from a conveyer which directly receives and conveys slices to a discharge position comprising a pivoted arm, means on said arm for engaging and moving the slices from said conveyer, and a brake shoe attached to said arm and moving along a braking surface on a stationary member, said stationary member being arranged with respect to the axis of rotation of said arm in such a position that the braking effect on said braking surface increases at a rapid rate toward the end of the outward movement of the discharge fly away from the conveyer whereby the motion of the discharge fly is suddenly arrested without appreciable jar to thereby insure that the slice will not cling to the discharge fly, but will be entirely freed therefrom and thrown flatly onto the slice receiving surface.

18. In a slicing machine, the combination with a slicing knife, of means for presenting a substance to said knife, a slice transferring means for transferring said slices after they are formed to a discharge position, a discharge fly for discharging slices from said transferring means when said slices move to said discharge position, comprising a pivoted arm having slice engaging means thereon, cam means for retracting said arm in one direction to an inoperative position prior to the arrival of slices at the discharge position, means for urging said discharge fly yieldingly in the opposite direction to discharge slices from said transferring means, and brake means for retarding the movement of said discharge fly under the influence of said yielding means comprising a link pivoted to said discharge fly eccentric of the axis of rotation thereof, a member having a braking surface thereon extending substantially in a single plane, a brake-shoe carried by said link and slidably engaging said braking surface whereby upon movement of said link, said brake-shoe is slid along said braking surface and the friction created there-between retards the movement of said discharge fly, the said link extending substantially perpendicularly to the plane of said braking surface when said discharge fly has moved substantially to its extreme position during discharge movement thereof, and being at an acute angle to said braking surface at the beginning of the movement of said discharge fly to discharge position, whereby the force transmitted to said brake-shoe by said discharge fly during discharge movement of said fly increases during the discharge movement due to the changing angle of said link from a position at an acute angle to said braking surface to a position substantially perpendicular thereto.

19. In a slicing machine, the combination with a slicing knife and means for moving a substance past said knife as slices are severed therefrom, a rigid rotatable drum having impaling means on the outer surface thereof and fixed to move bodily therewith for receiving slices as the same are formed by said knife and for conveying the same to a discharge position, means for discharging slices from said impaling means at a discharge position, a rotatable support, a pin connection between the support and drum to rotate said drum, a quickly releasable connection between the drum and support for detachably holding said drum in operative relation to said rotatable support, and means for rotating said rotatable support in timed relation to the severing of the slices by the knife.

20. In a slicing machine, the combination with a slicing knife and means for moving a substance past said knife as slices are severed therefrom, a rotatable drum having impaling means on the outer surface thereof for receiving slices as the same are formed by said knife and for conveying the same to a discharge position, means for discharging slices from said impaling means at a discharge position, a rotatable support, a pin connection between the support and drum to rotate said drum, a quickly releasable connection between the drum and support for detachably holding said drum in operative relation to said rotatable support, and means for rotating said rotatable support in timed relation to the severing of the slices by the knife, said quickly releasable connection comprising a detent member on said support adapted to over-lie a portion of said drum to positively prevent removal of said drum except if and when said detent is moved to an inoperative position.

21. In a slicing machine, the combination with a knife for cutting slices from a substance, of a substance support movable relative to said knife, a slice conveying means for engaging slices as they are formed and for conveying the same to a discharge position, driving means operatively connected to said support and normally actuating the conveyer in a predetermined timed relation with the movement of the support, means operatively connecting the driving means to the conveying means to permit movement of said conveying means at a speed different than the normal movement thereof whereby the speed of said conveying means may be varied with respect to its normal movement and to the movement of said support when a supplemental force other than the normal driving force is applied to said conveying means, the normal predetermined driving relation being automatically reinstated when said supplemental force becomes inoperative.

22. A stacking mechanism for slicing machines comprising a rotatable support, a slice conveying member comprising a drum portion having protruding prongs extending substantially equal distances away from the axis of rotation of said drum for receiving and holding a slice as the same is cut from a substance, a spindle mounted centrally of the axis of rotation of said drum, bearing members on said drum embracing said spindle, and a yielding driving connection between said drum and said support yieldable upon application of a retarding force thereto to permit movement of said conveying member relative to said rotatable support, whereby the speed of movement of said drum will automatically adjust itself to the speed of movement of a slice being formed and impaled upon said impaling prongs without affecting the yielding driving connection other than to vary the energy stored in said yielding portion thereof.

23. A slicing machine comprising a slice conveyer, means for driving said conveyer, and a yielding connection between said conveyer and driving means to permit said conveyer to travel at a different speed than that imparted thereto by said driving means when a supplemental force is applied to said conveyer other than that applied thereto by said driving means and without interrupting the drive to said conveyer by said driving means whereby the conveyer may have a normal driving speed and a speed which varies therefrom when said supplemental force is applied thereto, a horizontal slice receiving table arranged adjacent the conveyer, a discharge fly arranged adjacent the conveyer and table to discharge slices from the conveyer onto the table, and means for operating the discharge fly periodically in timed relation with the conveyer in an arc of substantially forty-five degrees whereby the slices when leaving the fly will drop by gravity on the horizontal table and be arranged in neat stacked relationship.

24. A slicing machine comprising a slice conveyer, means for driving said conveyer, and a yielding connection between said conveyer and driving means to permit said conveyer to travel at a different speed than that imparted thereto by said driving means when a supplemental force is applied to said conveyer other than that applied thereto by said driving means and without interrupting the drive to said conveyer by said driving means whereby the conveyer may have a normal driving speed and a speed which varies therefrom when said supplemental force is applied thereto, said conveyer receiving slices as they are cut, and means for removing slices from the conveyer when the conveyer has rotated substantially two hundred seventy degrees, said means for removing slices and discharging the slices from the conveyer in a direction toward the operator.

25. A slicing machine comprising a slice conveyer, means for driving said conveyer, and a yielding connection between said conveyer and driving means to permit said conveyer to travel at a different speed than that imparted thereto by said driving means when a supplemental force is applied to said conveyer other than that applied thereto by said driving means and without interrupting the drive to said conveyer by said driving means whereby the conveyer may have a normal driving speed and a speed which varies therefrom when said supplemental force is applied thereto, said yielding connection comprising a flat spring and a pair of spaced pins between which the spring is arranged.

WILHELMUS ADRIANUS van BERKEL.